United States Patent [19]

Donck et al.

[11] 4,189,348
[45] Feb. 19, 1980

[54] FUEL ROD ASSEMBLY TO MANIFOLD ATTACHMENT

[75] Inventors: Harry A. Donck; Anthony R. Veca; Harold J. Snyder, Jr., all of San Diego, Calif.

[73] Assignee: General Atomic Company, San Diego, Calif.

[21] Appl. No.: 708,410

[22] Filed: Jul. 26, 1976

[51] Int. Cl.² ............................................. G21C 3/10
[52] U.S. Cl. ........................................ 176/79; 176/68
[58] Field of Search ............................ 176/68, 78, 79

[56] References Cited

U.S. PATENT DOCUMENTS

| | | | |
|---|---|---|---|
| 3,157,580 | 11/1964 | Williams | 176/68 |
| 3,201,320 | 8/1965 | Fortescue et al. | 176/79 |
| 3,206,369 | 9/1965 | Fortescue et al. | 176/37 |
| 3,231,476 | 1/1966 | Thome | 176/78 |
| 3,275,522 | 9/1966 | Kinsey et al. | 176/68 |
| 3,297,540 | 1/1967 | Williams et al. | 176/78 X |
| 3,432,388 | 3/1969 | Fortescue | 176/37 |
| 3,743,576 | 7/1973 | Fortescue | 176/37 |

Primary Examiner—Peter A. Nelson
Attorney, Agent, or Firm—Fitch, Even & Tabin

[57] ABSTRACT

A fuel element is formed with a plurality of fuel rod assemblies detachably connected to an overhead support with each of the fuel rod assemblies having a gas tight seal with the support to allow internal fission gaseous products to flow without leakage from the fuel rod assemblies into a vent manifold passageway system on the support. The upper ends of the fuel rod assemblies are located at vertically extending openings in the support and upper threaded members are threaded to the fuel rod assemblies to connect the latter to the support. The preferred threaded members are cap nuts having a dome wall encircling an upper threaded end on the fuel rod assembly and having an upper sealing surface for sealing contact with the support. Another and lower seal is achieved by abutting a sealing surface on each fuel rod assembly with the support. A deformable portion on the cap nut locks the latter against inadvertent turning off the fuel rod assembly. Orienting means on the fuel rod and support primarily locates the fuel rods azimuthally for reception of a deforming tool for the cap nut. A cross port in the fuel rod end plug discharges into a sealed annulus within the support, which serves as a circumferential chamber, connecting the manifold gas passageways in the support.

8 Claims, 5 Drawing Figures

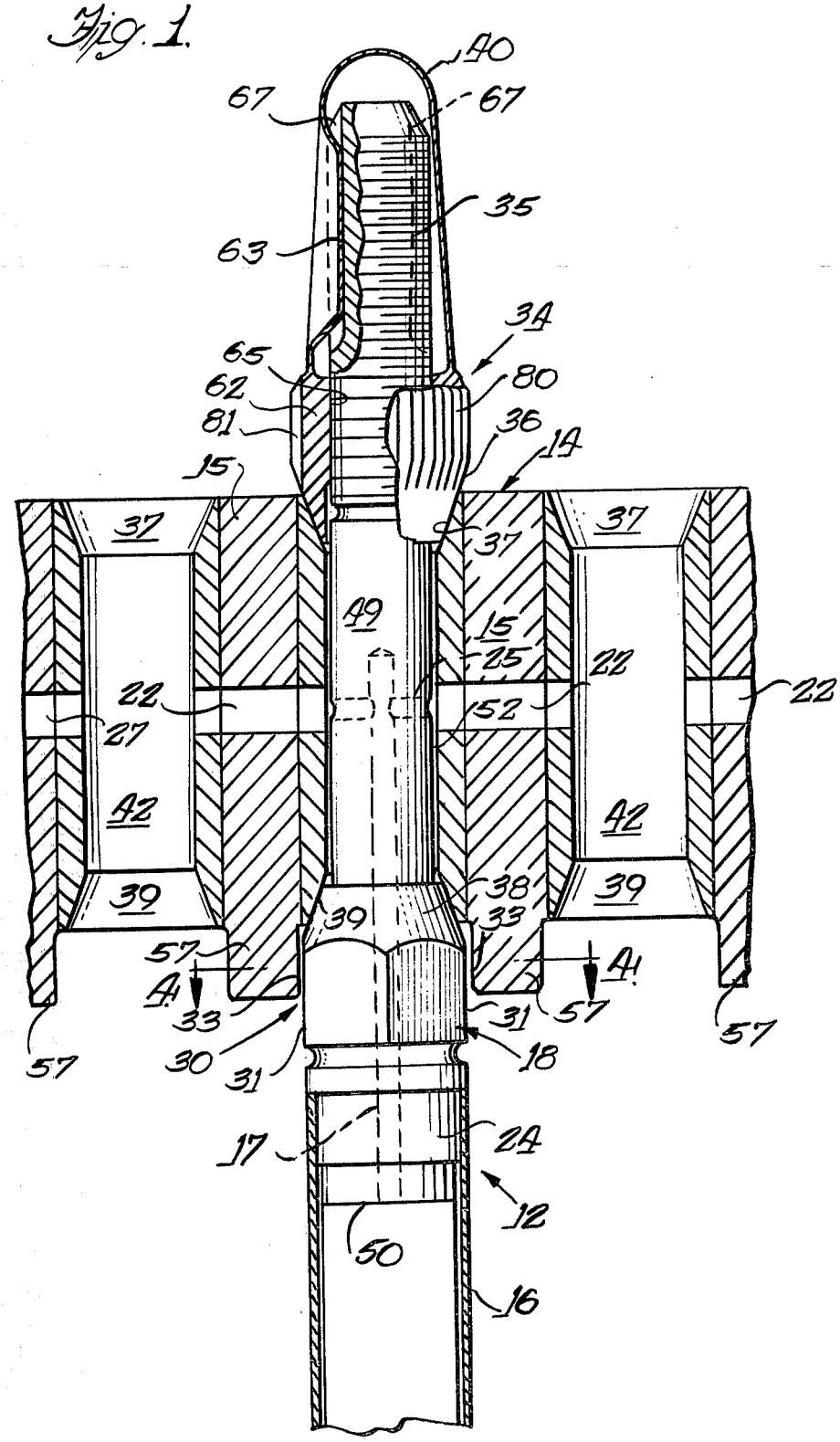

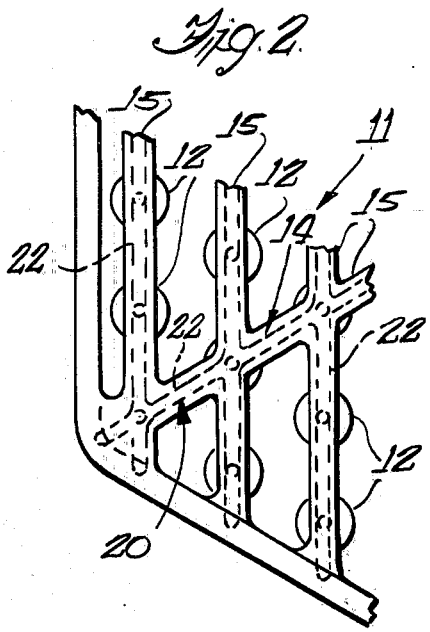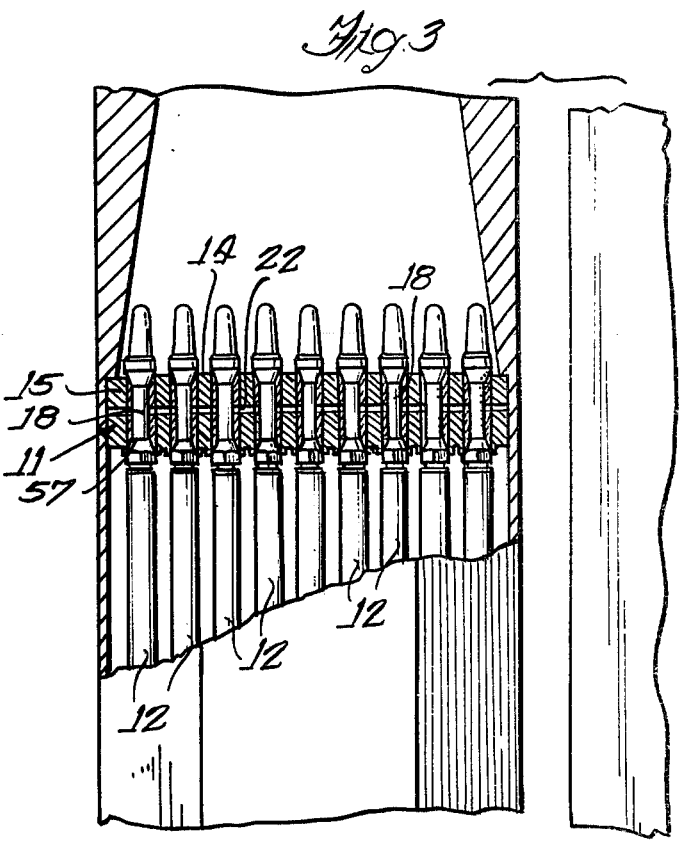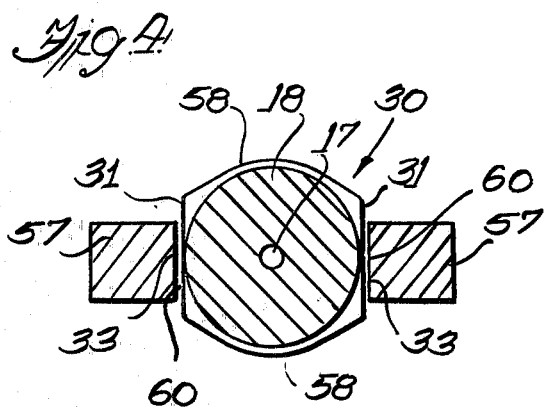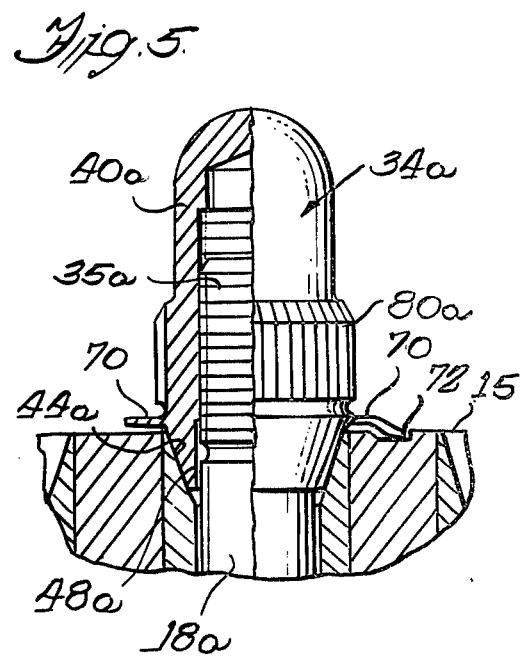

FUEL ROD ASSEMBLY TO MANIFOLD ATTACHMENT

This invention relates to nuclear fuel elements formed with a large number of depending fuel rod assemblies attached to and depending from an overhead support having a manifold system connected to each fuel rod assembly for the extraction of fission product gases generated by nuclear fuel during fission.

Nuclear fuel rod assemblies having solid nuclear fuel therein are often supported or hung by their upper ends to a grid-like support formed of interconnected beams having a manifold passageway system within the beams connected to each of the respective fuel rod assemblies for conveying gases therefrom. Such a fuel rod manifold and support system is disclosed in U.S. Pat. Nos. 3,743,576 and 3,432,388; and, as disclosed therein, the fuel rod assemblies were welded to their overhead supporting beams with gas tight welds between the fuel rod assembly and the lower wall of the beam. Often, a large number of fuel rod assemblies comprise a given fuel element, e.g., as many as two hundred and seventy-one or more fuel rod assemblies per fuel element.

Typically, these fuel rod assemblies are elongated pin-like structures, often called fuel pins, having an outer metallic cladding wall encircling the fuel and transferring heat to the coolant flowing past the outer surface of the cladding wall. Usually, the upper ends of fuel rod assemblies have a plug or shaft of metal which is hermetically sealed to the cladding wall and is formed with a central bore to allow fission product gases to flow upwardly to the manifold system in the supporting beams. To convey the fission product gases to the manifold system without leakage into the surrounding coolant, each of the upper plugs of the fuel rod assemblies were welded to their support beams. However, such a welding process is slow and expensive. Moreover, a leaking weld connection is difficult to correct particularly when it is located at an interior one of a large number of fuel rod assemblies attached to a common beam support.

Heretofore, it has been proposed to drill and tap the beam support and to thread the upper ends of the fuel plugs for releasable threading of the fuel rod assemblies directly to the support beams. However, threading of the beams also was found to be costly, time-consuming and inefficient. Thus, there is a need for a new and improved releasable interconnection between the fuel rod assemblies and their support beams which also provides a tight leak-free seal between the fuel rod assemblies and the support.

Accordingly, a general object of the present invention is to provide a new and improved fuel element having detachable fuel rod assemblies secured with a tight leak-free connection to a beam support having a manifold vent system therein.

Other objects and advantages of the invention will become apparent from the following detailed description taken in connection with the accompanying drawings in which:

FIG. 1 is a partially sectional view of a portion of a fuel rod assembly detachably secured to an overhead support having a vent manifold system and embodying the novel features of the invention;

FIG. 2 is a partial plan view of an overhead support of a fuel element for supporting a plurality of fuel rod assemblies;

FIG. 3 is a partial sectional view illustrating a fuel element in position within a nuclear reactor;

FIG. 4 is a cross-sectional view taken substantially along the line 4—4 in FIG. 1; and FIG. 5 is a view similar to FIG. 1 illustrating another embodiment of the invention.

As shown in the drawings for purposes of illustration, the invention is embodied in a nuclear fuel element 11 comprising a cluster or assembly of a plurality of individual fuel rod assemblies 12 each of which is supported within the fuel element by an overhead metallic support 14 in the form of a grid-like structure formed of horizontally extending metallic beams 15. Each of the fuel rod assemblies 12 comprises an outer metallic jacket 16 to which is secured a solid metal upper end plug 18 which is secured to a beam 15. An internal bore 17 is formed in the upper end plug to allow the flow of fission product gases generated during fissioning of the nuclear fuel material within the fuel rod assemblies upwardly into a manifold vent system 20 provided within the support 14. The manifold vent system includes a plurality of horizontally and longitudinally extending channels or passageways 22 formed in each of the beams 15 which support a plurality of fuel rod assemblies 12 and serve to collect gas from each of the fuel rod assemblies attached to a given beam. The fission product gases are collected and conveyed to a filtering and fission product receiving system of a conventional kind.

The fuel within each fuel rod assembly 12 is encased by an enclosed metallic cladding jacket 16 which is welded or otherwise hermically sealed at its upper end to the lower end 24 of the top end plug 18 to prevent leakage of the fission product gases from the fuel rod assembly into the coolant which flows about the exterior of the cladding jacket 16 and through the space between the beam 15 constituting the grid-like support 14. Usually, the fuel rod assemblies or fuel elements are fixedly secured to the support as by welding as disclosed in U.S. Pat. No. 3,743,576. These welds are made gas-tight to prevent leakage of fission gases from escaping between the support and the fuel rod assemblies in these conventional constructions. However, these welded connections do not allow easy removal of a fuel rod assembly and its replacement by another fuel rod assembly if one assembly is faulty.

In accordance with the present invention, a fuel element 11 is constructed with fuel rod assemblies 12 which are readily connected to or disconnected from their support 14 to allow replacement thereof and which have a tight sealed engagement with their support to prevent leakage of fission product gases at the interfaces therebetween. To locate the rod assembly 12 at predetermined rotational positions relative to the support 14, particularly for reception of a tool to deform a portion of a nut 34 into locking engagement with a portion of the end plug 18, an orienting means 30 is provided, preferably in the form of first cooperating surfaces or flats 31 on each fuel rod assembly 12 and second cooperating surfaces or flats 33 on the support 14, which, when abutted, prevent rotation of each of the fuel rod assemblies. These abutted flat surfaces 31 and 33 also prevent rotation of the fuel rod assemblies when the nuts 34 which are threaded onto upper threaded ends 35 of the upper end plug 18 are tightened and screwed downwardly into abutment with the support beam 15. The crossport 25 in the plugs 18, without azimuthal orientation requirement, discharges the fuel rod fission gas into annular clearance space 52, where it joins the main gas flow from adjacent fuel rods through manifold passageways 22. As the nuts 34 are tightened with a predetermined amount of torque, upper and lower seals are made with the support to prevent leakage of fission gas from the interfaces between the support and each fuel rod assembly. Herein the upper seal includes an upper seal surface 36 on the nut 34 for abutting a cooperating seal surface 37 on the support. The lower seal includes a lower seal surface 38 on the end plug 18 for abutting a cooperating seal surface 39 on the support. Preferably, the nut 34 is a domed or cap nut with a dome wall encircling the upper threaded end 35 of the end plug 18 to prevent the escape of any gases through the threaded connection between the nut 35 and the end plug.

Referring now in greater detail to the elements of the illustrated embodiment of the invention, each of the support beams 15 is formed with a plurality of vertically extending bores 42 spaced at intervals to receive an upper end plug 18 of a fuel rod assembly 12. The upper ends of these bores 42 have the upper sealing surface 37 which is preferably in the shape of a downwardly tapered, frustoconical wall for sealing engagement with complementary tapered frustoconical sealing surface 36 on the cap nut. At the lower end of each bore 42, the lower sealing surface 39 is formed, preferably as an upwardly and inwardly tapered frustoconical wall for sealing engagement with a similar frustoconical sealing surface 38 on the top end plug 18 of the fuel rod assembly. It will be appreciated that the upper ones of these frustoconical sealing surfaces 37 on the beams 15 permit the turning of the cap nuts on the threaded end of the plug with a concomitant forcing of the plug's lower frustoconical surface more tightly and more intimately into sealing contact with the lower frustoconical surface on the support beam 15. Although the preferred sealing surfaces 37 and 39 on the beams, the preferred sealing surfaces 36 on the nut and the preferred sealing surface 38 on the plug 18 are each frustoconical in shape, it will be appreciated that other shapes such as flat sealing surfaces may be used. Thus, gases attempting to escape in either the upward or downward direction from the bore 42 are effectively sealed by the engagement of the respective upper and lower frustoconical sealing surfaces, as above described, when the nut is tightly torqued against the top of the beam.

The illustrated upper end plug 18 for each fuel rod assembly 12 is in the form of a solid metal shaft, as best seen in FIG. 1, the lower end of which has been drilled with the vertically extending bore 17 which extends upwardly from a lower end wall 50 of the plug to intersect a cross port 25 drilled through a central cylindrical section 49 of the plug and extending in a generally horizontal direction. As illustrated in FIG. 1, the upper and central portion 49 of the upper end plug 18 is made with a diameter smaller than the diameter of the bore 42 in the beam leaving an annular clearance space 52 which ensures proper sealing surface alignments at the upper and lower end of vertically extending bore 17, and provides clear gas flow passage through manifold passageways 22.

The primary purpose of the orienting means 30 is to locate the plugs 18 at a predetermined rotational position on the support beam so that a tool (not shown) may be lowered to deform a portion of the cap nut 34 into grooves 67 in the plugs 18. Each fuel rod assembly is lifted into position between a pair of depending lugs 57 having the orienting surfaces 33 thereon, as best seen in FIGS. 1 and 4. More specifically, the cross-sectional dimension between opposed flats 31 on the upper end plug 18, as best seen in FIG. 4, is less than the cross-sectional dimension between opposite curved peripheral surfaces 58 on the upper end plug to allow upward movement only when the plug flats 31 are generally parallel to the orienting surfaces 33. A slight clearance space or gap 60 exists between these flat surfaces 31 and 33 allowing the upward insertion of the fuel rod assembly into the beam bore 42 and only a slight turning movement of the fuel rod assembly may occur before the flats 31 on the plug 18 abut the flats on depending lugs 57 of the support. Thus, it will be seen that despite the turning of the nuts 34 on the threaded upper ends of the plugs 18, the fuel rod assemblies 12 will retain their initial oriented positions with grooves 67 aligned for the deforming tool. It will be appreciated that the abutted flats will prevent rotation of the fuel rod assemblies 12 during the torquing or untorquing of the capped top nuts 34 when removing or inserting a fuel rod assembly. Herein, the cross port 25 is a circular bore and extends normal to the axis of the upper end plug without necessary azimuthal orientation at a predetermined height above the frustoconical sealing surface 38 on the end plug.

The illustrated threaded member is a nut 34 with a thick lower body 62 having an external gripping surface 80 which, in this instance, is provided with a vertical series of ribs 81 for receiving a gripping tool which will turn the cap nut on the thread on the end plug 18. An internal screw thread 65 is formed on inner wall of lower nut body 62 for threading engagement with the external thread machined on the upper threaded end 35 of the top end plug 18. The upper domed wall 40 of the cap nut 34 is integrally attached to and extends upwardly from the thick lower nut body 62 and is made of relatively thin metal. Thus, with the frustoconical surface 36 on the nut 34 abutting the support's frustoconical surface 37, any fission gas product leakage between the threads of the cap nut and the end plug will be contained by the domed wall 40 of the cap nut. It is to be understood that the threaded member 34 may have other shapes than that illustrated herein.

For the purposes of providing a final locking of the cap nut 34 after it has been tightly torqued to the beam 15, the cap cooperates with a portion of the top end plug 18 or with the support beam 15 to prevent inadvertent unthreading of the cap nut which would break the upper or lower seals. In the embodiment shown in FIG. 1, the upper end plug 18 is formed with a pair of vertically extending external grooves 67 cut into the peripheral upper wall of the end plug 18 and into the threads thereon. These grooves 67 are at a known and predetermined angular relationship relative to the flats 31 on the lower end of the plug so that the location of the grooves 67 will be known when it is desired to crimp or otherwise deform portions 63 of the thin metallic dome wall 40 on the cap nut 34 into these grooves 67. Even though a final locking has taken place with deformation of the wall portions 63 into the grooves 67, the removal of the fuel rod assembly still may be accomplished by gripping the outer gripping surface 80 of the nut and exerting sufficient overriding torque to the nut 34 to cause the deformed thin metal sections 63 of the dome wall 40 to be deflected outwardly from the grooves 67. Usually, this untorquing of the nut 34 will damage the nut to the extent that it cannot be reused; but these nuts can be readily replaced.

In accordance with a further embodiment of the invention, which is illustrated in FIG. 5, a threaded member in the form of a cap nut 34a has a thicker dome wall 40a than the deflectible thin dome wall 40. The locking means for this cap nut 34a is in the form of a thin deformable flange 70 located beneath the gripping portion 80a for deformation into a locking groove 72 in the top surface of the support beam 15. More specifically, the locking flange 70 is a thin-walled ring-like flange formed integral with the cap nut 34a and projecting radially outwardly over the top surface of the support beam 15. By deflecting a portion of the locking flange 70 into the locking groove 72 which has a limited arcuate extent, after the locking nut 34a has been tightly torqued onto the upper threaded end 35a of the top end plug 18a, the final locking will be achieved between the lock nut 34a and the beam 15 to prevent loosening of the nut 34a.

The present invention provides a simple manner of interconnecting and sealing a multiplicity of fuel rod assemblies to a common support. Although the fuel rod assemblies have been illustrated as supported at their upper ends, the fuel rod assemblies may be supported at their other lower ends and sealed to a bottom support and fall within the purview of the invention. These releasable threaded mechanical connections provide a significantly lower cost interconnection than the welding interconnection. Welding is a particularly time-consuming and expensive process when large numbers of fuel assemblies have to be individually welded and then tested for gas leaks. If a gas leak occurs between a centrally located one of the fuel rod assemblies and the support, it is extremely difficult, if not impossible, to fix the leak or to replace the leaking fuel rod assembly with a non-leaking fuel rod assembly when using welded connections.

While a preferred embodiment has been shown and described, it is intended that other modifications and alternate constructions are covered by the appended claims.

What is claimed is:

1. In a nuclear fuel element, the combination comprising: a horizontally extending support with gas manifold passageways for receiving gas products, a vertically extending opening in said support, a depending fuel rod assembly having an upper end releasably secured to said support, a jacket on said fuel rod assembly enclosing solid nuclear fuel, a gas passageway formed in said fuel rod assembly for conveying gases generated during fission from said solid fuel upwardly to said support, a threaded portion on said upper end of said fuel rod assembly, a threaded member for threading engagement with the threaded upper end of said fuel rod assembly and for abutting said support to releasably secure said fuel rod assembly to said support, and cooperating sealing means to seal against leakage of the gas passing from said fuel rod gas passageway into said manifold gas passageway, said threaded member comprising a closed cap nut having an outer dome wall for enclosing the threaded end of said fuel rod assembly.

2. A fuel element in accordance with claim 1 in which a deformable portion on said cap nut interlocks with a portion of said fuel rod assembly to prevent turning of said cap nut relative to said fuel rod assembly.

3. A fuel element in accordance with claim 1 in which a deformable portion is provided on said cap nut for being deformed into engagement with a portion of said support to interlock said cap nut against turning in the removal direction.

4. A fuel element in accordance with claim 2 in which orienting means on said fuel rod assembly and said support are abutted for limiting the turning movement of the fuel rod assembly and in which a grooved surface on each of said fuel rod assemblies is oriented at a predetermined position by said orienting means to assist a deforming tool in deforming said deformable portion of said cap nut into said grooved surface.

5. A fuel element comprising a support having a plurality of horizontally spaced beams, said beams having vertically disposed openings therein for receiving fuel rod assemblies and having manifold passageway means including passageways extending between adjacent openings for conveying vented gas from a plurality of fuel rod assemblies through said passageway means, a plurality of fuel rod assemblies each having their upper ends attached and supported by said support at one of said openings, a gas passageway in said fuel rod assemblies comprising a vertically extending bore and a horizontally extending cross bore for discharging gas into said manifold passageways, cooperating orienting means on said fuel rod assemblies and on said support for abutment and limiting the turning rotation of the fuel rod assemblies, a threaded upper end on each of said fuel rod assemblies projecting into one of said openings in said support beams, a threaded member for threading engagement with each of said threaded ends of said fuel rod assemblies and for abutting said support to attach said fuel rod assemblies thereto, a lower sealing surface on each said fuel rod assemblies for sealing engagement with one of said support beams, and an upper sealing surface on said threaded member for sealing engagement with one of said support beams, said threaded member comprising a threaded cap nut having a dome wall encircling the upper end of said fuel rod assembly, said orienting means orienting said upper fuel rod ends relative to said cap nuts.

6. A fuel element in accordance with claim 5 in which said upper and lower sealing surfaces are frustoconical surfaces and in which frustoconical surfaces are formed in said support at the upper and lower ends of said openings for sealing engagement with said frustoconical surfaces on said cap nut and on said fuel rod assembly.

7. A fuel element in accordance with claim 6 in which locking means lock said cap nuts against turning on said threaded ends of fuel rod assemblies.

8. In a nuclear fuel element, the combination comprising: a horizontally extending support with gas manifold passageways for receiving gas products, a vertically extending opening in said support, a generally vertically extending fuel rod assembly having one end releasably secured to said support, a jacket on said fuel rod assembly enclosing solid nuclear fuel, a gas passageway formed in said fuel rod assembly for conveying gases generated during fission from said solid fuel to said support, a threaded portion on said one end of said fuel rod assembly, a threaded member for threading engagement with the threaded portion of said fuel rod assembly and for abutting said support to releasably secure said fuel rod assembly to said support, and first sealing means on one side of said support to seal against leakage of the gas passing from said fuel rod gas passageway into said manifold gas passageway, and second sealing means on the other side of said support including a wall encompassing the end of said threaded portion of said rod to capture gas products passing along said threads of said threaded portion and threaded member.

* * * * *